United States Patent
Li et al.

(10) Patent No.: US 9,111,263 B2
(45) Date of Patent: Aug. 18, 2015

(54) ADAPTIVE MEETING MANAGEMENT

(75) Inventors: Jin Li, Sammamish, WA (US); James E. Oker, Woodinville, WA (US); Rajesh K. Hegde, Redmond, WA (US); Dinei Afonso Ferreira Florencio, Redmond, WA (US); Michel Pahud, Kirkland, WA (US); Sharon K. Cunnington, Sammamish, WA (US); Philip A. Chou, Bellevue, WA (US); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1061 days.

(21) Appl. No.: 12/484,949

(22) Filed: Jun. 15, 2009

(65) Prior Publication Data

US 2010/0318399 A1 Dec. 16, 2010

(51) Int. Cl.
G06Q 10/00 (2012.01)
G06Q 10/06 (2012.01)
G06Q 10/10 (2012.01)

(52) U.S. Cl.
CPC .......... *G06Q 10/109* (2013.01); *G06Q 10/1093* (2013.01)

(58) Field of Classification Search
CPC ............................... G06Q 10/00; G06Q 10/06
See application file for complete search history.

(56) References Cited

U.S. PATENT DOCUMENTS

| | | | |
|---|---|---|---|
| 7,007,235 B1 | 2/2006 | Hussein et al. | |
| 7,117,504 B2 * | 10/2006 | Smith et al. | 719/328 |
| 7,448,046 B2 | 11/2008 | Navani et al. | |
| 7,630,986 B1 * | 12/2009 | Herz et al. | 1/1 |
| 2001/0034738 A1 | 10/2001 | Cantwell et al. | |
| 2004/0225650 A1 * | 11/2004 | Cooper et al. | 707/3 |
| 2005/0066304 A1 | 3/2005 | Tattrie et al. | |
| 2005/0222971 A1 * | 10/2005 | Cary | 707/1 |
| 2006/0085245 A1 * | 4/2006 | Takatsuka et al. | 705/9 |
| 2006/0143270 A1 | 6/2006 | Wodtke et al. | |
| 2007/0112926 A1 | 5/2007 | Brett et al. | |
| 2009/0254971 A1 * | 10/2009 | Herz et al. | 726/1 |

OTHER PUBLICATIONS

Rienks, "Meetings in Smart Environments: Implications of progressing technology", Dissertation, University of Twente, Velsen, The Netherlands, 2007.*
"4D Meetings", retrieved at <<http://www.4d.com/products/4dmeetings.html>> on May 19, 2009, 3 pgs.
"Collaboration Services: Technical Summary", retrieved at <<http://www.eds.com/services/collaboration/technical.aspx>> on May 19, 2009, EDS, Hewlett-Packard Development Company, 9 pgs.

(Continued)

*Primary Examiner* — Thomas Mansfield
(74) *Attorney, Agent, or Firm* — Micah Goldsmith; Judy Yee; Micky Minhas (57) ABSTRACT

A template and/or knowledge associated with a synchronous meeting are obtained by a computing device. The computing device then adaptively manages the synchronous meeting based at least in part on the template and/or knowledge.

20 Claims, 7 Drawing Sheets

(56) References Cited

OTHER PUBLICATIONS

"FileMaker Meetings 2.0", retrieved at <<http://www.filemaker.com/products/applications/meetings/home.html>> on May 19, 2009, FileMaker, 2 pgs.

"WebCommander Now Includes a New Point-and-Click User Interface for Ad-hoc for Scheduled Conferences, Improved Workflow and Time-Saving Conference Templates", retrieved at <<http://www.vcinsight.com/default.asp?artID=582>> on May 19, 2009, VideoConferencing Insight Newsletter, Dec. 18, 2002, 2 pgs.

* cited by examiner

ADAPTIVE MEETING MANAGEMENT

BACKGROUND

Meetings often don't accomplish their intended purposes. Participants may show up late or not show up at all. Speakers may take more than their allotted times. Too much time may be spent on an unimportant subject, and too little time may be spent on a critical subject. These and many other problems often plague business and personal meetings, as well as other social encounters.

To make meetings run more efficiently, participants often utilize agendas. The agendas can include a list of topics, a list of speakers, or both. The agendas can also be broken into time segments, each segment being assigned to a particular speaker and/or topic. Creation of the agendas is usually a manual process, performed by someone leading the meeting or by administrative personnel. While the person crafting the agenda may take into account information about the availabilities and schedules of participants, such information is often ignored. And even when the information is not ignored, the schedules of the participants often change after the agenda is created. By the time the meeting takes place, the agenda will often serve at best as a loose guide, with topics being skipped because of late arrivals, early departures, or no-shows of critical participants.

SUMMARY

Techniques for adaptively managing a synchronous meeting based on templates and/or knowledge associated with the meeting are described herein. A software agent of a computing device performing the adaptive managing obtains one or both of the templates and knowledge. The software agent then adapts the templates based on the knowledge and utilizes the adapted templates in adaptively managing the meeting. Additionally, while managing the meeting, the software agent gathers additional knowledge associated with the meeting and utilizes the additional knowledge in adaptively managing the meeting. Further, while managing the meeting, the software agent collects meeting metrics and/or minutes. At the close of the meeting, the software agent then updates the templates and/or knowledge based on the meeting metrics.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF DRAWINGS

Non-limiting and non-exhaustive examples are described with reference to the following figures. In the figures, the left-most digit(s) of a reference number identifies the FIG. in which the reference number first appears. The use of the same reference numbers in different figures indicates similar or identical items or features.

DETAILED DESCRIPTION

This disclosure describes the adaptive management of synchronous meetings based on templates and/or knowledge associated with the synchronous meetings. In some implementations, the adaptive management is further based on additional knowledge that is gathered while the meeting occurs. Metrics and results of the meetings are then used to update the templates, the knowledge, or both.

In various implementations, the adaptive management is performed by a software agent of a computing device. The computing device obtains the templates and/or knowledge from local storage, from a web service, or from one or more other computing devices. The templates may simply be documents or may instead be collections of software modules that the software agent utilizes to manage the synchronous meeting. The knowledge may include information such as calendars of meeting participants or traits of those participants (e.g., regularly arrives to meetings on time. In some implementations, the software agent uses the knowledge and templates to create adapted templates, and uses the adapted templates for adaptive management.

The adaptive management may include actions such as rearranging an order of speakers or topics, removal or addition of topics, or changing the allocation of time given to a speaker or topic. Upon performing the actions, the software agent alerts meeting participants of the changes by, for example, communicating with computing devices of the meeting participants. During the meeting, the software agent also communicates with the computing devices or the participants or other, remote devices to gather additional knowledge (e.g., a location an arrival time of a meeting participant, an indication of what activities a meeting participant is using his or her device for, etc.). In some implementations, the software agent also relies on cameras, microphones, or other components with which its computing device is equipped to gather the additional knowledge.

The additional knowledge and any other data collected during the meeting are then used to generate metrics of whether the meeting was successful (e.g., an indication of whether all the topics were covered, an indication of whether a speaker went over his or her allotted time, etc.). The software agent then updates the templates, the knowledge, or both based on the meeting metrics.

As used herein, a "synchronous meeting" refers to a meeting where participants are contemporaneously present in a shared space, such as a meeting room, and/or to a communication where audio and/or video is streamed live from one participant to another (e.g., a remote participant).

A phrase in the form "A/B" means A or B. A phrase in the form "A and/or B" means "(A), (B), or (A and B)". A phrase in the form "at least one of A, B, and C" means "(A), (B), (C), (A and B), (A and C), (B and C), or (A, B and C)". A phrase in the form "(A)B" means "(B) or (AB)" that is, A is an optional element.

Example Framework

Figure 1A:
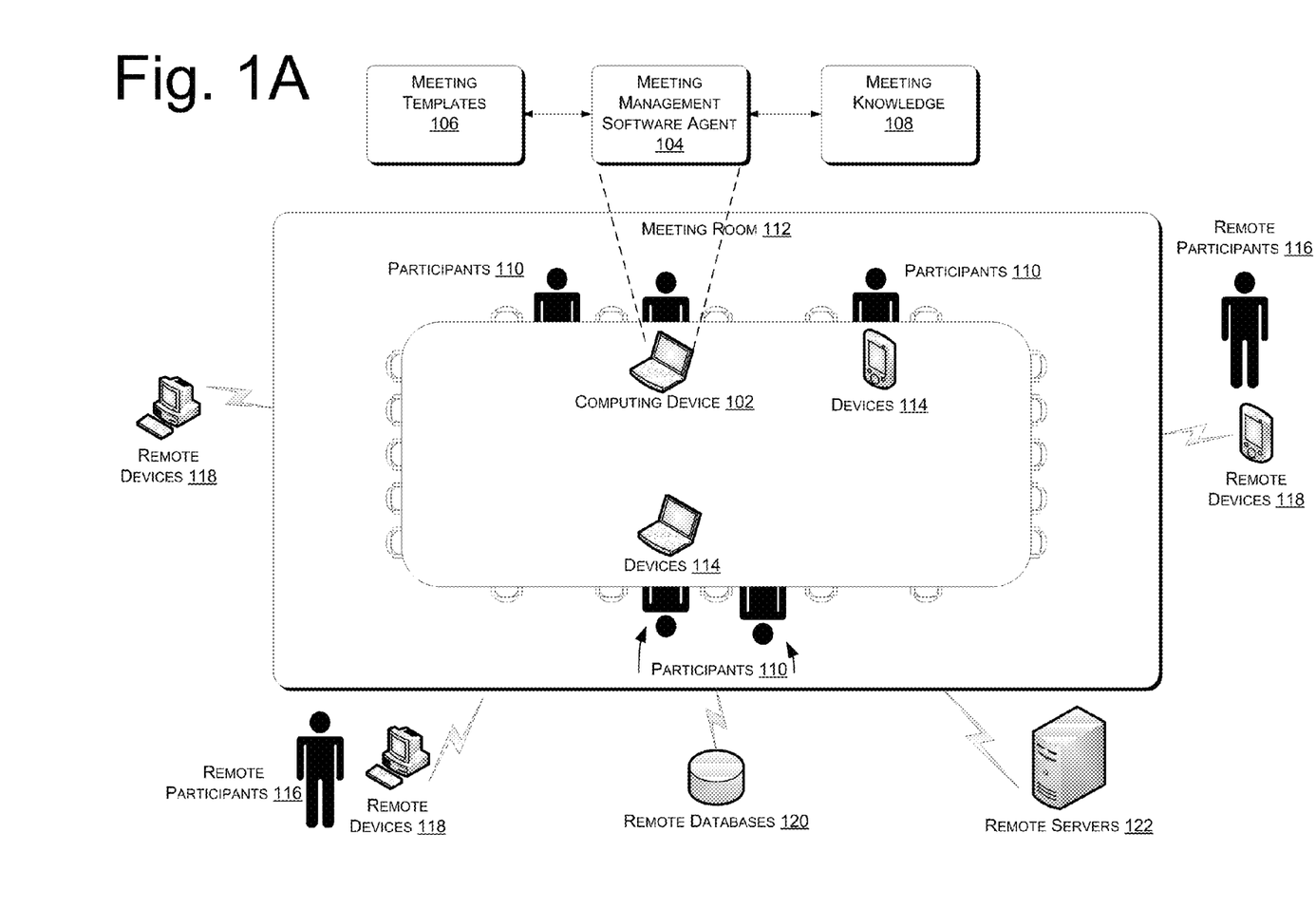
FIGS. 1a-1b illustrate example frameworks in which adaptive meeting management is implemented.
Figure 1B:
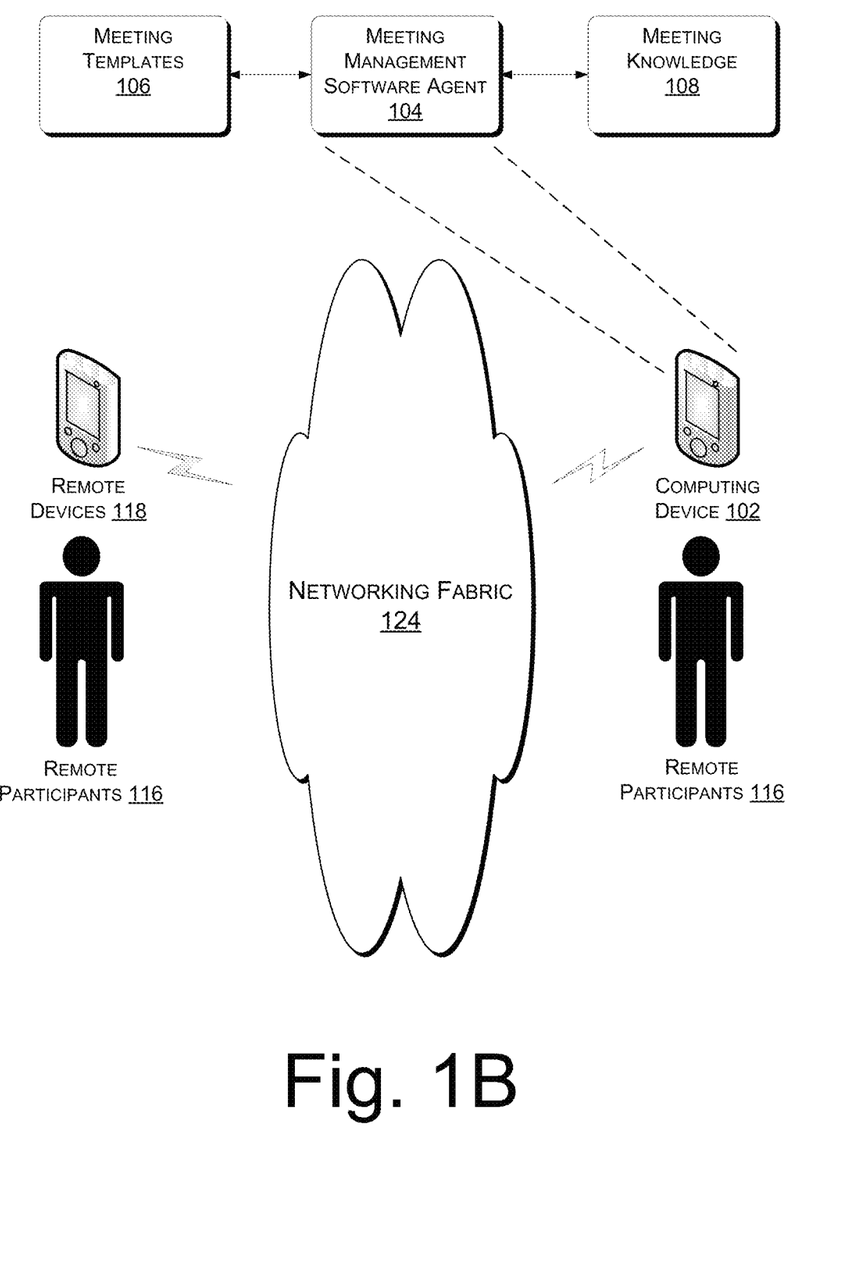

FIGS. 1a-1b example frameworks in which adaptive meeting management is implemented. FIG. 1a illustrates a synchronous meeting taking place at least partially in a meeting room. As illustrated in FIG. 1a, the framework includes a computing device 102 equipped with a meeting management software agent 104 (hereinafter "software agent 104") that is configured to adaptively manage a synchronous meeting. In some implementations, the software agent 104 adaptively manages the meeting based on meeting templates 106 (hereinafter "templates 106") and/or meeting knowledge 108 (hereinafter "knowledge 108") associated with the meeting.

As is further shown in FIG. 1a, the synchronous meeting may involve a plurality of participants 110 meeting in a meeting room 112, the computing device 102 with the software agent 104 being the computing device of one of the participants 110. In various implementations, some of other participants 110 have their own devices 114 which may be in communication with the computing device 102. In another implementation, not shown, the software agent 104 may be implemented on a remote computing device.

Further, in addition to the participants 110 participating from the meeting room 112, one or more remote participants 116 may also participate using remote devices 118. The local devices 114, the remote devices 118, as well as any remote databases 120 and/or servers 122 may be used by the software agent 104 in adaptively managing the meeting.

Figure 2:
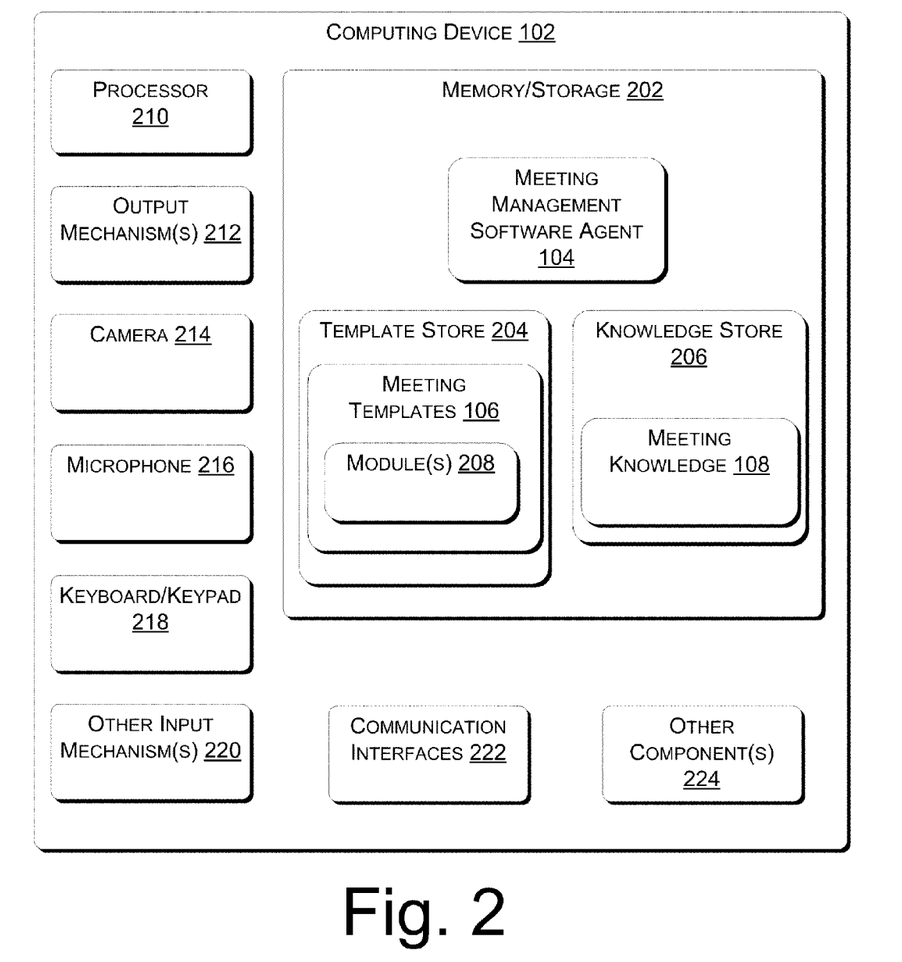
FIG. 2 is a block diagram of selected modules in an example computing device configured to adaptively manage a synchronous meeting.

Also, in addition to the synchronous participants, some participants may give input asynchronously. For example, a participant that cannot participate may decide to pre-record a position statement. In another example, the participants 110 may decide to request a follow up from a colleague which was not available at the time of the meeting In various implementations, the computing device 102 may include any sort of computing device known in the art, such as, for example, a personal computer (PC), a laptop, a server, a mainframe, a phone, a personal digital assistant (PDA), a set-top box, a game console, a television, and a data center. As shown in FIG. 1a, the computing device 102 may be the computing device of one of the participants 110. In other implementations, not shown, computing device 102 may be an integrated component of meeting room 112 interfacing with other components of the meeting room 112, or a remote server 122, as discussed further herein. In other implementations, the computing device 102 may actually represent a plurality of devices and/or servers over which the the software agent 104 is distributed. Computing device 102 may have or interface with one or more of a microphone, a camera, a video camcorder, or any other device capable of capturing audio or visual data related to a meeting. An example computer device 102 is illustrated in FIG. 2 and is discussed in greater detail below.

In some implementations, the software agent 104 is one or more modules of executable instructions stored at least partially on the computing device 102, the computing device 102 being configured to execute the software agent 104. In other implementations, software agent 104 is at least partially implemented in one or more hardware components, such as application-specific integrated circuits (ASICs). Regardless of whether the software agent 104 comprises executable instructions, hardware components, or both, the software agent 104 is capable of adaptively managing a synchronous meeting.

In various implementations, the software agent 104 is first triggered by the creation of a meeting event, such as a meeting invite sent out from one participant 110/116 to a plurality of other participants 110/116. The meeting event could be any sort of data entity associated with a meeting, the new meeting event including one or more of a meeting type, participants, a location, and or an agenda.

In response to the creation of the meeting event, the software agent 104 may automatically generate a template 106, automatically select a template 106, or enable a user to select a template 106.

In one implementation, the automatic generating is based on data associated with previous meetings. The data associated with previous meetings could comprise metrics from those meetings (discussed below) or agendas of previous meetings. For example, the software agent 104 could automatically generate such a template 106 by retrieving information associated with a past behavior of a participant, such as speaking for more than an allotted time, and by modifying an agenda associated with the meeting event. Additionally, the software agent 104 may further generate the template 106 by associating modules of executable instructions with the template 106. For example, the software agent 104 may associate a module for reordering speakers to any template 106 with an agenda including more than one speaker. Further, templates 106 may include modules for asynchronous participation. For example, there may be a module for explicitly asking a higher authority to record a position statement to be discussed in the meeting. Or it may allow participants who decline to record a short message. Further yet, it may include modules for post-meeting follow up. For example, it may include requesting input from an expert, or management about a topic discussed in the meeting, as well as directives on what to do after the position is recorded (e.g., forward to all participants).

In some implementations, the software agent 104 automatically selects a template 106 from a locally and/or remotely stored collection of templates. The templates 106 could each be associated with a meeting type, and the software agent 104 could select the template 106 based on a match between the template's meeting type and the meeting event's meeting type.

In other implementations, the software agent 104 provides a user with a user interface, such as a graphic user interface, to enable the user to select among a number of templates 106, such as locally or remotely stored templates. The user interface may also allow the user to see characteristics of the templates 106 so as to make a better choice among the templates 106.

In various implementations, the software agent 104 also facilitates the retrieval, modification, and/or specification of the templates 106. For example, the templates 106 may have been created in advance and may be offered by a web service. The templates 106 may be a bundle of templates that are made available to anyone who purchases a license to the software agent 104, or may simply be a publicly available collection. In other implementations, the templates 106 may be purchased individually or in bundles. Once made available to the software agent 104, either the software agent 104 or other executable instructions of the computing device 102 may facilitate modification of the templates 106. For example, the software agent 104 or other executable instructions might provide a user interface, such as a graphic user interface, that enables a user to select additional participants, change a location, alter a speaker lineup, etc.

In some implementations, the software agent 104 may facilitate a user in specifying a new or revised template 106. To facilitate the user in specifying a template 106, the software agent 104 could provide a user interface, such as a graphic user interface. The user interface might comprise a text entry area, one or more draggable items, a drop-down selection box, and/or a list associated with check boxes that a user can select from. For example, a user might select a plurality of modules of executable instructions, each associated with a meeting task (e.g., managing speaker order), through use of the user interface.

In some implementations, the templates 106 may be documents, such as word processing documents, XML files, or HTML files, or other formats. In other implementations, the templates 106 may comprise executable instructions, such as modules of executable instructions for carrying out specific meeting tasks.

In one example implementation, the templates 106 may specify one or more of a meeting agenda, a meeting location, meeting start and/or end times, meeting participants, speakers, introductions, goals, preferences, and/or meeting equipment. Each item comprising the template 106 may be associated with a specific set of executable instructions (e.g., instructions to retrieve a participant location that are associated with that participant's identity, etc.), a priority, and/or relations to one or more other items specified by the template 106. For example, a template 106 may list three speakers, an order of importance for each speaker, and an allotted time for each speaker. The software agent 104 might use such a template 106 to select between the two remaining speakers if the other of the three has spoken much longer than his or her allotted time.

The templates may also define one or more of participant roles, meeting rules, allowable actions, secretarial duties, data communications, or user preferences. For example, a template 106 could indicate that a specific participant 110 and/or 116 is to be secretary of the meeting and could also indicate that another participant 110 and/or 116 is designated as a "back-up" secretary. The software agent 104 might use such a template 106 to alert the participant 110 and/or 116 designated as "back-up" secretary when the secretary-participant 110 and/or 116 is unavailable for some reason.

In some implementations, as mentioned above, the templates 106 may also be associated with specific meeting types. For example, each template 106 may be associated with one of a feedback meeting, a brainstorming meeting, a classroom scenario, an ice breaking meeting, an introduction meeting, a review meeting, a client meeting, a decision meeting, or a social meeting. Based on the meeting type, specific participants, speakers, equipment, etc. may be included in the template 106. In one implementation, all templates 106 sharing a meeting type also share one or more modules of executable instructions or some other trait determined to be important to meetings having that meeting type. All brainstorming meetings, for example, may require a meeting room 112 with a white board. All brainstorming meeting templates 106, then, would specify a white board as required equipment.

In some implementations, the templates 106 may also be associated with a meeting level, such as "corporate", "user", etc. which may be used to determine meetings to which the template is applicable or may be used for permissioning (e.g., only certain meetings can use templates with a certain level).

In various implementations, after generating or selecting a template 106, the software agent 104 obtains knowledge 108 that is associated with the meeting defined by the meeting event. The knowledge 108 is any sort of data associated with a synchronous meeting that is gathered from any number of sources. For example, the knowledge may include one or more of calendars of meeting participants, templates and/or results of previous meetings, recorded messages from declined meeting participants, indications of topics in which declined meeting participants are interested in participating, indications of topics which meeting participants 110 are interested in covering, relevance to upcoming meetings, and traits of meeting participants. The software module 104 may obtain the knowledge 108 from devices of meeting participants 110 and remote participants 116, such as devices 114 and 118, or from other computing devices. A meeting participant schedule could be obtained, for instance, from a calendaring application of the meeting participant 110. Knowledge 108 associated with a meeting could be obtained when the template(s) 106 for the meeting are created or selected, when the meeting is scheduled, and/or could be obtained at the start of the meeting. Once obtained, the knowledge 108 could be stored by the software agent 104, either in local storage of the computing device 102 or in remote storage accessible by the computing device 102.

Once knowledge 108 has been obtained, the software agent 104 utilizes the knowledge 108 to create an adapted template. The template 106 could be adapted, for example, by altering an order of speakers based on a calendar of a participant 110 (e.g., one of the participants 110 is in a different time zone or a calendar of one of the participants 110 indicates that the participant 110 must leave the meeting early (i.e. because of consecutive meetings in different locations), and thus the participant 110 is made the first speaker or have his slot moved earlier than planned in the meeting). The adapted template can then be stored and used in place of the template 106.

Figure 5:
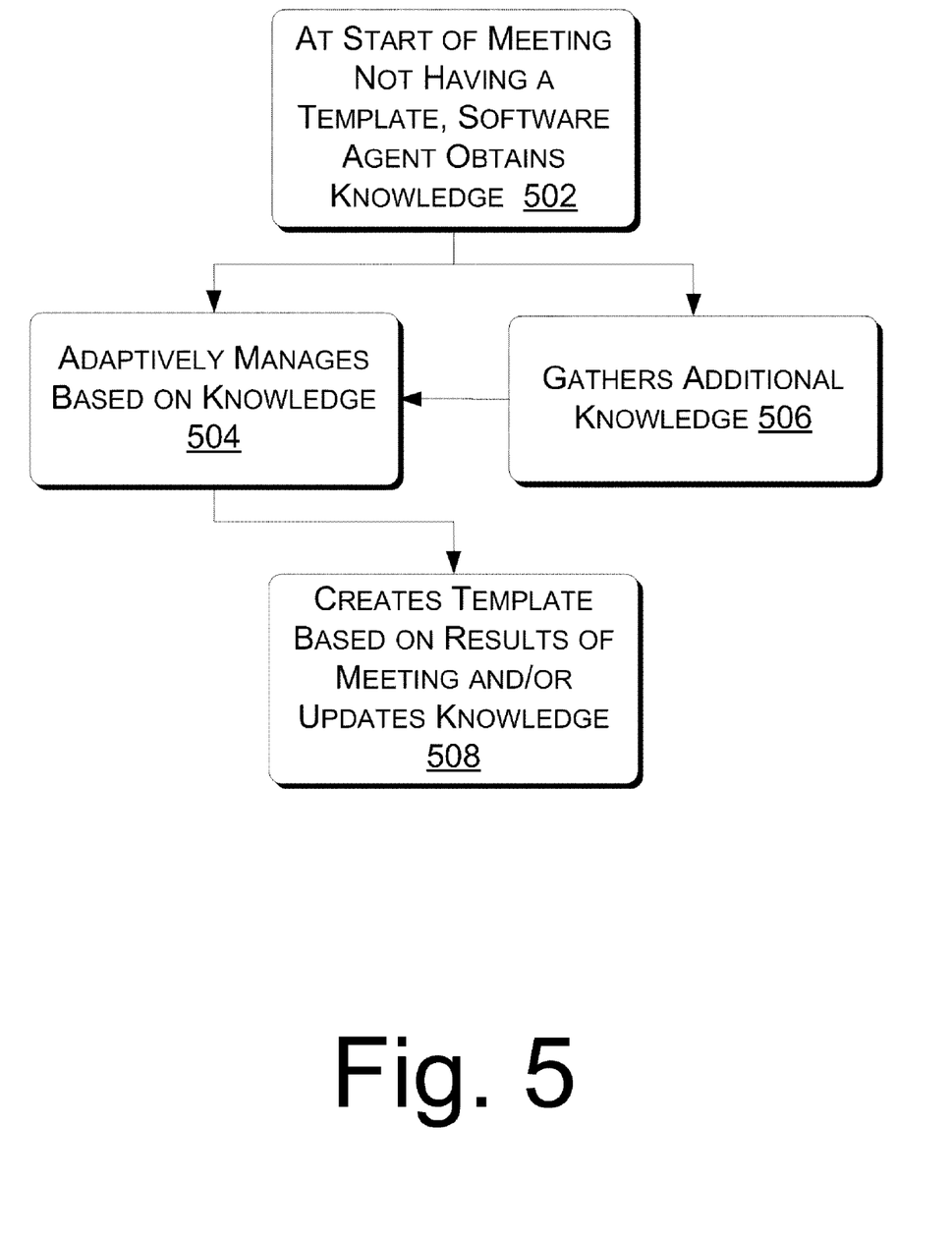

In other implementations, the software agent 104 does not create an adapted template, but rather just utilizes the template 106 to manage the meeting and the knowledge 108 to adapt the management of the meeting as it occurs. In yet other implementations, the software agent 104 may utilize only one of a template 106 and knowledge 108. If no knowledge 108 is available, the template 106 is used as the basis for adaptive management of the meeting. If no template 106 is available, the software agent 104 can use the knowledge 108 to manage the meeting. Adaptive management without a template 106 is illustrated by FIG. 5 and is described in greater detail below.

In various implementations, the software agent 104 begins adaptive management of the meeting at a specified time. Once the specified time occurs, the software agent 104 may determine if conditions necessary for the meeting to being have been met. For example, the software agent 104 might utilize the templates 106 and/or knowledge 108 to determine which participants 110 and/or 116 are required to be present for the meeting to start (e.g., required attendees). To determine presence, the software agent may gather additional knowledge, such as inputs from cameras and/or microphones of the meeting room 112 or of the computing device 102 or from communication tools such as Office Communicator, etc., to determine if a voice or images matches a voice or image known for the required participant. The software agent 104 may also or instead communicate with location sensors of devices of participants, such as devices 114 or 118 to determine the location of the participants.

Once the software agent 104 has determined that the meeting has begun, the software agent 104 communicates with the participants 110 and/or 116 to indicate what should happen at a given time during the meeting. Determinations of what should happen at a given time may be defined by the above-described adapted template, the template 106, and/or the knowledge 108. The software agent 104 may communicate by providing the participants 110/116 with an electronic copy of an agenda determined by the template 106 or may communicate messages such as "John Smith will begin to discuss tooth decay in 5 minutes" as new topics and speakers begin and end.

In one implementation, the software agent 104 may even act as a virtual participant. For example, the software agent 104 may use text-to-speech technology and computing device speakers to interject messages regarding meeting flow, such as indications of when a speaker will begin or end speaking, etc. Additionally, in acting as a virtual participant, the software agent 104 may play recorded messages of declined participants. As mentioned above, such messages may be a part of knowledge 108, having been recorded by a declined participant at the time, for example, that he or she declined the meeting invitation.

In some implementations, the adaptive management also comprises performing one or more of determining a revised speaking order, reducing the topics covered, suggesting new topics to cover, alerting a speaker that time is up or soon to be up, alerting speakers that a topic has been covered before, alerting participants as to when it is important that they participate, providing a recap of a prior meeting, suggesting a new location, playing recorded messages of declined participants, and/or alerting declined participants if a topic in which they wish to participate comes up during the meeting. The software agent 104 may perform any or all of these actions based on the adapted template, the template 106, and/or the knowledge 108 using alerts or by acting as a virtual participant in the manner described above. The software agent 104 may further perform the actions based on additional knowledge, as mentioned above.

In various implementations, while adaptively managing the meeting (e.g., while communicating with participants 110 and/or 116, etc.), the software agent 104 gathers additional knowledge. The software agent 104 may gather the additional knowledge using components of the computing device 102—such as a camera and/or a microphone—or through communication with other computing devices, such as participant devices 114, remote devices 118, remote databases 120, and/or remote servers 122.

The additional knowledge can include one or more of behavioral metrics of meeting participation, behavior metrics of meeting success, occurrence of topics related to recorded messages from declined meeting participants, occurrence of topics in which declined meeting participants are interested in participating, completion of a meeting task, a time associated with performance of a meeting task, and an estimated time of arrival of a missing meeting participant.

Metrics of meeting participation could include activities performed on devices 102, 114, and/or 118, such as instant messaging or sending emails, or frequencies with which participants 110 and/or 116 interject comments. Such metrics could be used by the software agent 104 to change topics when no one is interested or paying attention to a current topic.

Behavior metrics of meeting success could include data indicating moods or dispositions of participants 110 and/or 116 such as comments, facial expressions, tone of voice, people leaving the room, or body language known to be positive or negative. Such body language recognition may also take into account the culture, the type of the meeting, etc.

The occurrence of topics related to recorded messages from declined meeting participants, in some implementations, could cause the software agent 104 to act as a virtual participant and play the recorded message, as is described above. In various implementations, declined meeting participants can also indicate, when they decline a meeting invitation, topics in which they wish to participate or presenter they which to listen to. Upon the occurrence of such a topic, or a presenter speaking, the software agent 104 attempts to contact the declined participant, through, for example, a remote device 118. The declined participant could then choose to participate as a remote participant 116 or, if located close to the meeting room 112, could choose to arrive and act as a participant 110.

In some implementations, the software agent 104 adaptively manages the meeting based on an estimated time of arrival of a missing meeting participant. Such an estimate time could be calculated using positions of the missing participant (obtained for, example, using a global positioning system (GPS) locator) and a location of the meeting room 112. If a missing participant is estimated to arrive later than a time at which the missing participant is scheduled to speak, the software agent 104 could alter the speaker order based on the estimated time of arrival and on one or more of the adapted template, the template 106, and/or knowledge 108.

In various implementations, while adaptively managing the meeting, the software agent 104 collects or determines meeting metrics. The meeting metrics could be data derived from the additional knowledge, such as whether a topic was not covered, whether a speaker spoke too long, or whether the body language of participants 110 and/or 116 indicated unhappiness with a speaker, tone of the voice of presenters or of participants in side conversations, words or sentences said by other participants during a presentation, topic, or the meeting in general, etc. Meeting metrics could also be gathered after the completion of the meeting. For example, the software agent 104 could send the participants 110 and/or 116 a survey.

After the completion of the meeting and the collecting/determining of the meeting metrics, the software agent 104 updates one or both of the templates 106 and knowledge 108 based on the meeting metrics. For example, if knowledge 108 includes a data structure for storing traits of a participant 110 and the meeting metrics show that the participant 110 was very unhappy with a certain speaker, and indication of this fact could be stored in the database. In the future, the software agent 104 might prevent or warn the participant 110 from attending future meetings in which that speaker has a speaking role. In another example, if the software agent 104 altered the speaker order in a meeting based on a module of a template 106 and the reaction of participants was negative comments, the software agent 104 may alter the module of the template 106 so as to avoid the same situation reoccurring.

As is further illustrated in FIG. 1*a*, the meeting room 112 used for the above-described meeting could be any sort of physical space. In one implementation, the meeting room 112 may even be a virtual space rendered on computing devices of participants 110. In other implementations, the meeting room 112 could be a "smart meeting room". A smart meeting room could be, for example, a room equipped with cameras, microphones, speakers, and/or a computing device which enable the room to monitor and communicate with the participants 110 and/or 116. In such implementations, the computing device 102 may even be an integrated part of the smart meeting room.

The devices 114 and 118 described above, as well as the remote server 122 could be any sort of computing devices, such as, for example, personal computers (PCs), laptops, servers, mainframes, phones, personal digital assistants (PDAs), or set-top boxes. The remote database 120 could be any sort of database known in the art, such as a structured database, a relational database, or even an unstructured file. The devices 114 and 118, the remote database 120, or the remote server 122 could be used to store any, part, or all or the templates 106, knowledge 108, or additional knowledge, as described above.

In various implementations, the computing device 102 may be connected to any, some, or all of devices 114 and 118, remote database 120, or remote server 122 via one or more networking fabrics (not shown). In various implementations, the networking fabrics include one or more public and/or private networks, such as private data networks, public data networks, and the Internet. The one or more networks also can include local area networks (LANs), wide area networks (WANs), and/or personal area networks (PANs).

FIG. 1b illustrates an alternative implementation of the exemplary framework in which the synchronous meeting does not occur in a meeting room. As illustrated in FIG. 1b, two or more remote participants 116 participate in a synchronous meeting via a networking fabric 124. Networking fabric 124 may be any sort of networking fabric known in the art, such as the networking fabric described above in reference to FIG. 1a.

In various implementations, the computing device 102 in FIG. 1b is equipped with the software agent 104 described above, the software agent adaptively managing the meeting based on templates 106 and/or knowledge 108. To adaptively manage the meeting, the software agent 104 communicates with the remote device(s) 118 via the networking fabric 124. As described above, the adaptive management may include the software agent 104 providing alerts to the remote device(s) 118 to be shared with its remote participant(s) 116 or acting as a virtual participant in the meeting, communicating with participants 116.

Figure 4:
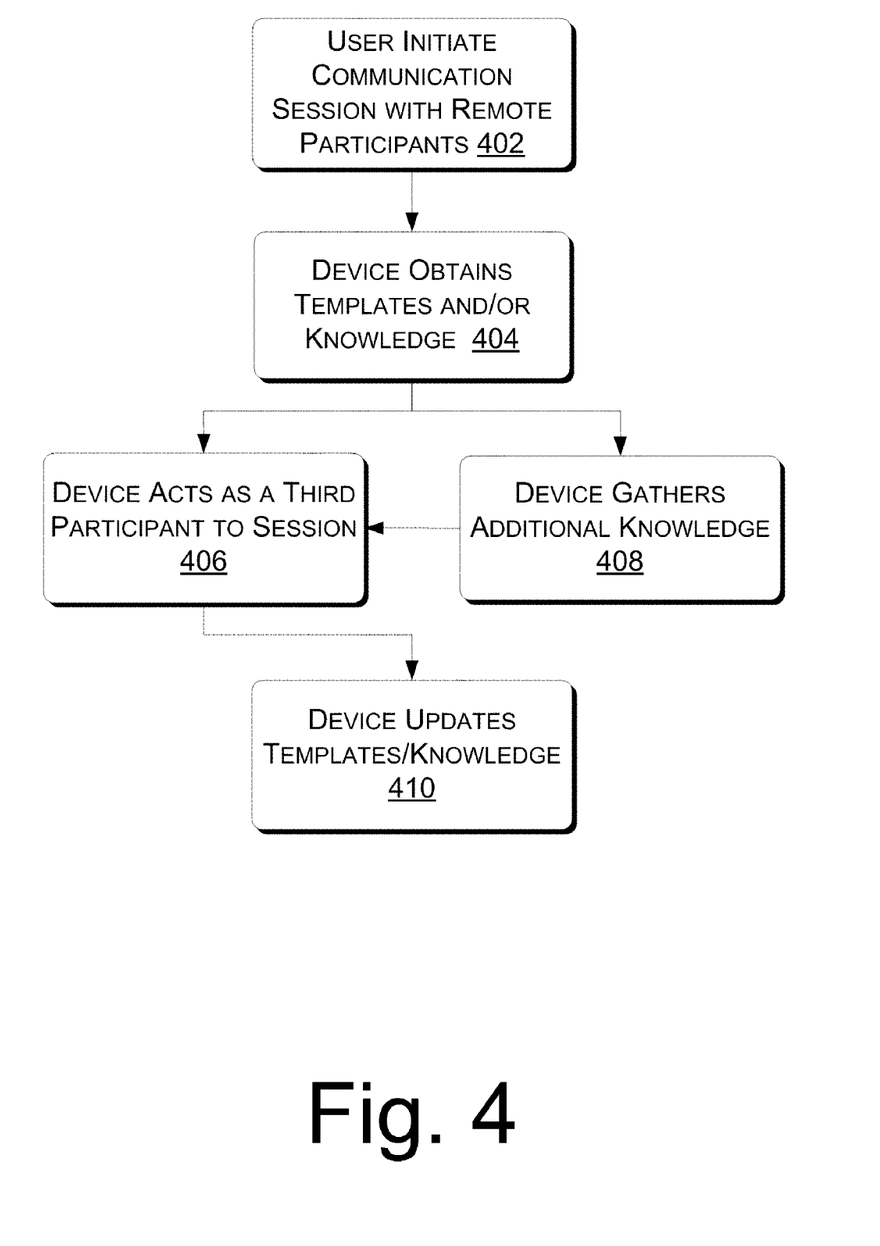
FIGS. 4-6 are flowchart views of example operations occurring in a number of different scenarios in which adaptive meeting management is used.

In one implementation, illustrated in greater detail in FIG. 4, the software agent 104 acts as a third participant to the meeting or as a proxy for one of the participants 116. For example, the meeting may be a phone call between the participants 116. During the phone call, one of the participants may receive a second call and have to put the other participant 116 on hold. While on hold, the software agent 104 may take the place of the now unavailable participant 116. While taking the place of the unavailable participant 116, the software agent 104 could, for example, provide a slide show of photos related to a topic that was just being discussed, such as the children of the unavailable participant 116. When the unavailable participant takes the call off hold, the software agent 104 ceases to act as a third/proxy participant.

Example Computing Device

FIG. 2 illustrates example components, modules, and data in the computing device 102 of FIGS. 1a-1b. As illustrated, a computing device 102 includes a memory/storage 202 storing the software agent 104 and including a template store 204 and a knowledge store 206, the template store 204 storing some or all of the templates 106 and their module 208 and the knowledge store storing some or all of the knowledge 108. The computing device also includes a processor 210, one or more output mechanisms 212, a camera 214, a microphone 216, a keyboard/keypad 218, other input mechanisms 220, communication interfaces 222, and other components 224.

In some implementations, memory/storage 202 includes a system memory, removable storage, and/or non-removable storage. Such system memory is volatile (e.g., RAM), non-volatile (e.g., ROM, flash memory, etc.), or some combination of the two. Thus, memory/storage 202 includes volatile and nonvolatile, removable and non-removable media implemented in any method or technology for storage of information, such as computer readable instructions, data structures, program modules, or other data. System memory, removable storage, and non-removable storage are all examples of computer storage media. Memory/storage 202 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102.

In some implementations, the template store 204 and knowledge store 206 are simply allocated portions of the memory/storage 202. In other implementations, the template store 204 and knowledge store 206 are also data structures or databases capable of storing the templates 106 and/or knowledge 108 in a pre-defined format. The templates 106 and knowledge 108, as well as the software agent 104, are all described above in reference to FIGS. 1a-1b.

The template modules 208, shown in FIG. 2 as belonging to templates 106, are also described above in greater detail. As describe above, the template modules 208 may comprise the templates 106 or may be stored separately and associated with the templates 106 by the software agent 104 or a user.

In various implementations, processor 210 may comprise any sort of processor or group of processors known in the art. In addition to or instead of a physical processor, processor 210 may also include one or more virtual processors of one or more virtual machines.

In some implementations, output mechanisms 212 include a display, speakers, and/or a printer. These and other output mechanisms 212 are well known in the art and need not be discussed at length here. As described above in detail, these output mechanisms 212 can be used by the software agent 104 to adaptively manage a meeting by communicating alerts or acting as a virtual participant in the meeting.

The camera 214, microphone 216, and keyboard/keypad 218 are also well known in the art and need not be discussed at length here. As described above in detail, the camera 214, microphone 216, and keyboard/keypad 218 can be used to gather knowledge and metrics during a meeting, such as the additional knowledge and meeting metrics. The software agent 104 then performs adaptive management of the meeting based on the gathered knowledge.

In some implementations, the computing device 102 optionally contains other input mechanisms 220. The other input mechanisms 220 may include touch screens, fax machines, and scanners, among others. These other input mechanisms 220 are well known in the art and need not be discussed at length here.

In various implementations, the computing device includes one or more communication interfaces 222, such as Ethernet ports and wireless cards and associated drivers. These and other communication interfaces 222 are well known in the art and need not be discussed at length here. The communication interfaces 222 can be used to communicate with networking fabric 124 and/or other networking fabrics, as described above.

In some implementations, the computing device 102 optionally contains other components 224. The other components 224 may include any components known in the art that may be incorporated in a computing device 102. For example, the computing device 102 may include input device(s) such as a mouse, a keyboard, a voice input device, a touch input device, etc., output device(s) such as a display, speakers, a printer, etc., and communication means, such as Ethernet ports and wireless cards and associated drivers, etc. These other components 224 are well known in the art and need not be discussed at length here.

Example Operations

Figure 3:
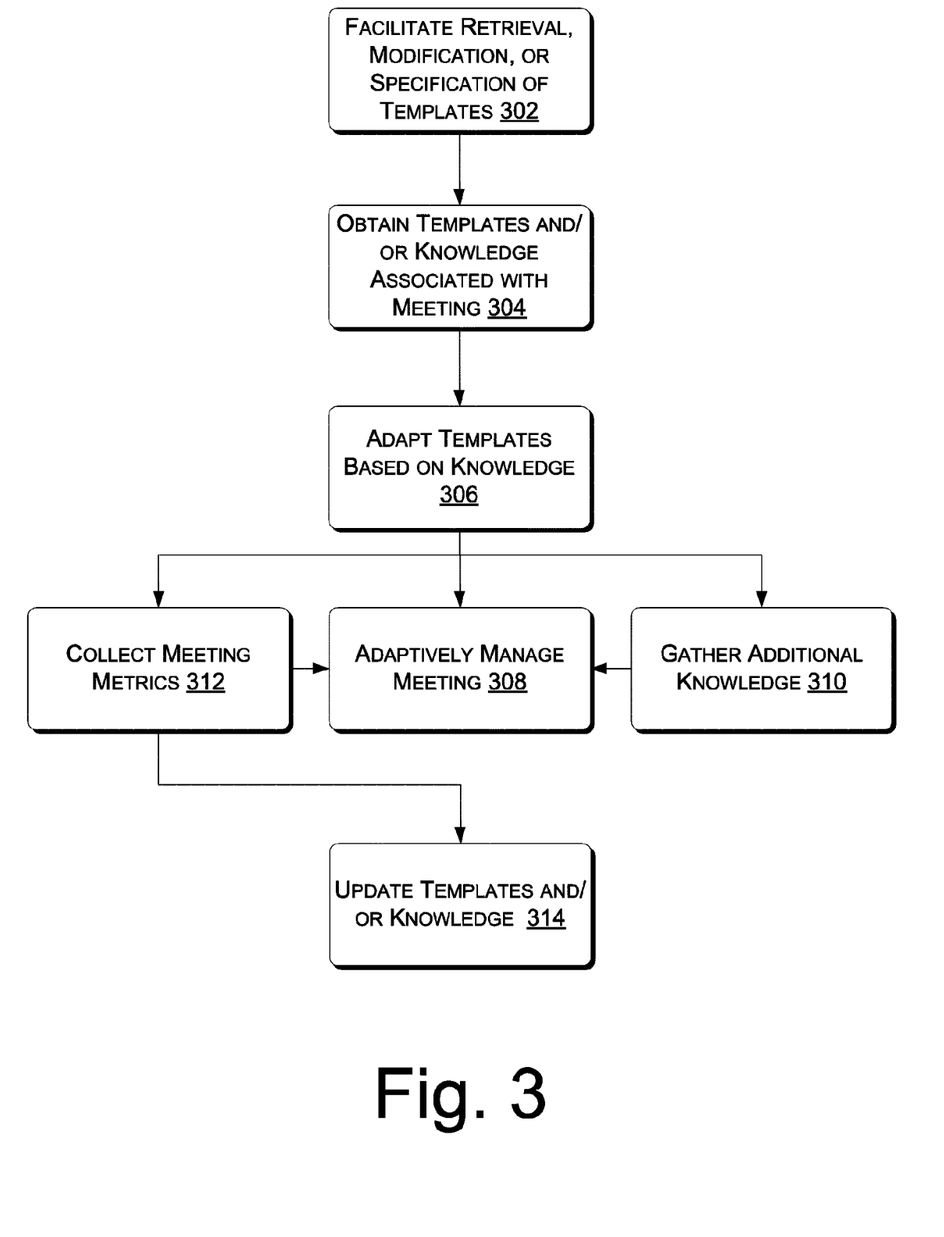
FIG. 3 is a flowchart view of example operations of a computing device configured to adaptively manage a synchronous meeting.

FIG. 3 is a flowchart view of example operations of a computing device configured to adaptively manage a synchronous meeting. While shown as operations of a computing device, the operations may instead be implemented in whole or in part on any one or more computing devices, each such computing device being a special purpose computing device configured to perform the operations or portion thereof implemented on that device.

As illustrated, the computing device may first facilitate the modification, specification, and/or retrieval of templates, block 302. The templates may have been automatically generated by the computing device, selected based on a meeting type of the meeting for which the template is to be used, or retrieved from a web service.

The computing device then obtains templates and/or knowledge associated with a synchronous meeting, block 304. Once the templates and/or knowledge are obtained, the computing device may adapt the templates based to the knowledge to create adapted templates for use in adaptively managing the meeting, block 306.

In various implementations, the computing device then adaptively manages the meeting, block 308, based on the adapted templates, the template, and/or the knowledge. The computing device may begin the adaptive management at a pre-determined time or when a quorum of participants arrives or joins the meeting. The adaptive management can include the computing device providing of alerts or acting as a virtual participant in the meeting.

While adaptively managing the meeting, the computing device also gathers additional knowledge, block 310. The additional knowledge may include video or audio from the meeting captured by the computing device or another device, or may include other data associated with the meeting from any computing device. The computing device then adaptively manages the meeting based further on the additional knowledge, block 308.

Also while adaptively managing the meeting, the computing device collects or determines meeting metrics indicating success or failure of the meeting or a portion of the meeting, block 312. In some implementations, the meeting metrics may comprise the additional knowledge. In other implementations, the meeting metrics may be additional data items gathered during the meeting. The computing device then updates the templates and/or knowledge based on the meeting metrics, block 314, to refine the templates and/or knowledge and increase the chances for a successful meeting in the future.

Example Scenarios

Figure 6:
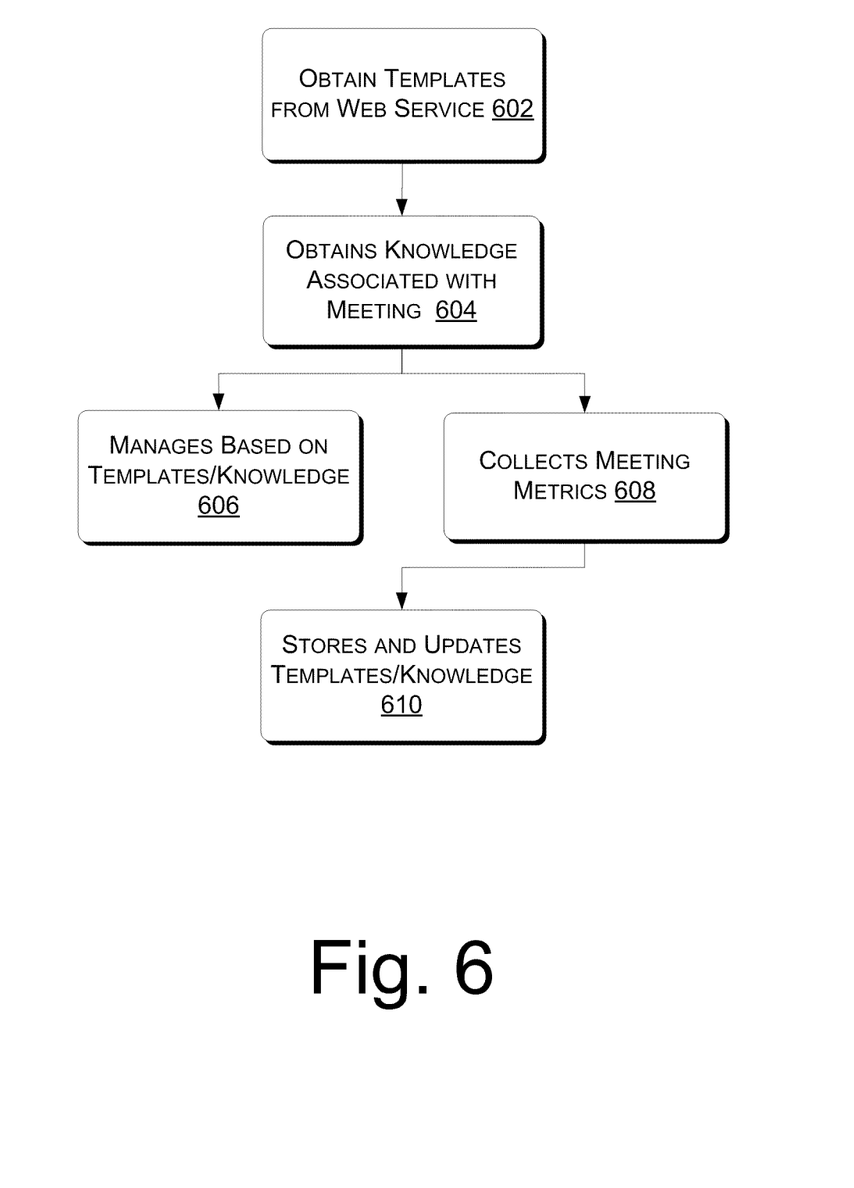

FIGS. 4-6 are flowchart views of example operations occurring in a number of different scenarios in which adaptive meeting management is used. While shown as operations of a computing device, the operations may instead be implemented in whole or in part, in serial or in parallel, on any one or more computing devices, each such computing device being a special purpose computing device configured to perform the operations or portion thereof implemented on that device.

FIG. 4 illustrates example operations of a computing device used in a meeting between remote participants. As illustrated, the computing device may first enable a user to initiate a communication session with a remote participant, block 402. The communication session could be a phone call, a video conference, or some other kind of virtual meeting known in the art. The communication session could be associated with a meeting event of the sort described above with reference to FIGS. 1a-1b and could further be associated with a template for the communication session.

In various implementations, the computing device then obtains templates and/or knowledge, block 404, that are associated with the communication session. The details of templates and knowledge are described above in reference to templates 106 and knowledge 108.

Based on the templates and/or knowledge, the computing device acts as a third participant to the communication session, block 406, adaptively managing the communication session. For example, at a given point in the communication session, the computing device could interject audio or visual content, pushing the audio or visual content to one or both of the participants to the communication session. One participant, for instance, might have a conflicting appointment during the communication session. At the time that appointment occurs, the computing device could take over on behalf of that participant, interacting with the remaining participant(s) by providing a slide show or presentation. In another example, if the communication session is a phone call and one participant needs to place the other(s) on hold, the computing device could present content to the other participant(s) while the hold lasts.

As is also shown in FIG. 4, while the communication session occurs, the computing device gathers additional knowledge related to the communication session, block 408. The additional knowledge could involve schedules, activities, or locations of the participants, or could cover any sort of data associated with the communication session. For example, if one of the participants is participating via phone and is about to enter a location without coverage, the computing device could inform the participants that the communication session is about to terminate and attempt to reestablish the session when coverage improves. In this and other ways, the computing device could use the additional knowledge to act as a third participant in the communication session, block 406.

In various implementations, at the close of the communication session, the computing device updates the templates and/or knowledge, block 410, in the manner described above with reference to FIGS. 1a-1b and 3.

FIG. 5 illustrates example operations of a computing device used in a meeting that is not associated with a template. As illustrated, at the start of a meeting not associated with a template, the computing device obtains knowledge associated with the meeting, block 502. The knowledge can include calendars of meeting participants, templates and/or results of previous meetings, documents used or created during previous meetings, recorded messages from declined meeting participants, indications of topics in which declined meeting participants are interested in participating, indications of topics which meeting participants are interested in covering, relevance to upcoming meetings, and traits of meeting participants, as described above.

Based on the obtained knowledge, the computing device adaptively manages the meeting, block 504. For example, if the meeting is associated with an agenda sent with a meeting invitation, the computing device may compare the schedule of speakers included in the agenda to calendars of meeting participants and reorder the speakers based on those calendars. Also, if the knowledge indicates that one of the speakers tends to speak past her allotted time and is of lesser importance than other speakers, the computing device can reorder the speakers, placing that speaker last on the agenda. The computing device may use the obtained knowledge on the fly, in a similar manner to how it would use a template, to adaptively manage a meeting.

In some implementations, while adaptively managing the meeting, the computing device also gathers additional knowledge associated with the meeting, block 506. The additional knowledge could involve schedules, activities, or locations of the participants, or could cover any sort of data associated with the meeting. The computing device could use this additional knowledge to further adaptively manage the meeting, block 504.

In various implementations, at the close of the meeting, the computing device creates a template based on the results of the meeting and/or updates knowledge, block 508, in the manner described above with reference to FIGS. 1a-1b. For example, if the computing device had to reorder the speakers because of calendar conflicts of participants and because one of the speakers spoke for too long, the computing device may associate modules for acquiring and processing calendar information and modules for individual traits with a new template.

FIG. 6 illustrates example operations of a computing device that manages a meeting based on templates and/or knowledge. As illustrated, the computing device may first obtain templates from, for example, a web service, block 602. The computing device may have selected the templates based on a match between a meeting type of a template and a meeting type of a meeting for which the selected template is to be used.

In various implementations, the computing device then obtains knowledge associated with the meeting, block 604. The knowledge may be gathered from devices of participants or from any other number of devices and may include information associated with schedules of participants, traits or participants, information associated with the location of the meeting, or any other data associated with the meeting.

The computing device then adaptively manages the meeting based on the templates and knowledge, block 606. The adaptive management could involve, for example, updating an agenda associated with the templates based on the obtained knowledge.

While performing the adaptive management, the computing device collects or determines meeting metrics, block 608, such as the amount of time taken by a speaker, topics covered, reactions of participants, or any other metrics which could be used to categorize the meeting as a success or a failure. The computing device could capture the metrics during the meeting through audio or visual sensors or through monitoring by participant devices, or could capture the metrics after the meeting through a survey.

In some implementations, the computing device then stores and updates the templates and knowledge, block 610. The templates and knowledge may be stored locally, as illustrated in FIG. 2. The updating of templates and knowledge based on meeting metrics is also described above with reference to FIGS. 1a-1b.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
retrieving, by one or more processors, from a plurality of stored meeting templates, a meeting template associated with a meeting, the meeting template including meeting rules associated with a particular type of meeting;
determining, by the one or more processors, multiple participants associated with the meeting;
retrieving, by the one or more processors from multiple computing devices, individual schedules associated with individual participants of the multiple participants, individual computing devices of the multiple computing devices corresponding to the individual participants of the multiple participants;
scheduling, by the one or more processors, the meeting based on the individual schedules and the meeting template;
adaptively managing the meeting, comprising:
determining, by the one or more processors, using voice recognition performed on audio data provided by one or more microphones, a presence of at least one participant of the multiple participants;
determining, by the one or more processors, that conditions associated with initiating the meeting have been satisfied;
after initiating the meeting, retrieving, by the one or more processors from the multiple computing devices, updated individual schedules associated with the individual participants; and
rearranging, by the one or more processors, an order of at least a portion of a plurality of topics to be discussed in the meeting based on the updated individual schedules.

2. The method of claim 1, further comprising:
performing, by the one or more processors, facial recognition of at least one participant that is present in a meeting room that is associated with the meeting using video data provided by one or more cameras.

3. The method of claim 1, further comprising:
before the meeting has concluded, playing back, by the one or more processors, an audio recording or a video recording of a meeting invitee who was unable to participate in the meeting.

4. The method of claim 1, wherein, before the meeting has concluded, the method further comprises:
providing, by the one or more processors using a speech synthesizer, an audio introduction to at least one topic of the plurality of topics to be discussed in the meeting before the meeting has concluded.

5. A method comprising:
retrieving, by one or more processors, a meeting template in response to receiving a meeting notification, the meeting notification specifying a particular type of meeting;
determining, by the one or more processors, multiple participants associated with the meeting based at least partly on the particular type of meeting;
determining, by the one or more processors, using voice recognition on audio data provided by one or more microphones or facial recognition on video data provided by one or more cameras, a presence of at least one participant of the multiple participants;
determining, by the one or more processors, that conditions associated with initiating the meeting have been satisfied, the conditions including a minimum number of participants;
retrieving, by the one or more processors, from multiple computing devices corresponding to the multiple participants, individual schedules associated with individual participants of the multiple participants and individual locations associated with the individual participants;
rearranging, by the one or more processors, an order of at least one topic to be discussed in the meeting based on the individual schedules and the individual locations; and
after the meeting has concluded, generating, by the one or more processors, metrics based on data gathered during the meeting.

6. The method of claim 5, wherein the meeting template includes at least one of:
an agenda associated with the meeting;
one or more meeting room locations;
a start time associated with the meeting;
an end time associated with the meeting; or
meeting rules associated with the meeting.

7. The method of claim 5, wherein the meeting template includes:
   identities of one or more participants associated with the meeting; and
   a role associated with at least one participant of the one or more participants.

8. The method of claim 5, wherein the meeting template includes:
   identifies of one or more presenters to speak during the meeting;
   a priority associated with at least one of the one or more presenters; and
   a time allotted to at least one of the one or more presenters.

9. The method of claim 5, wherein the meeting template includes:
   a list of equipment to be used for the meeting, the list of equipment including the one or more microphones used to determine an identity of one or more participants using the voice recognition.

10. The method of claim 5, wherein the meeting template includes:
    a list of equipment to be used for the meeting, the list of equipment including the one or more cameras used to determine an identity of one or more participants using the facial recognition.

11. The method of claim 5, wherein rearranging, by the one or more processors, the order of the at least one topic to be discussed in the meeting comprises:
    determining, by the one or more processors, that at least one of the individual schedules has changed after the meeting was initiated; and
    rearranging, by the one or more processors, the order of the at least one topic to be discussed in the meeting based on the at least one of the individual schedules that has changed.

12. The method of claim 5, further comprising:
    providing, by the one or more processors, a user interface to modify the meeting template; and
    modifying, by the one or more processors, the meeting template based on user input received via the user interface.

13. The method of claim 5, further comprising:
    playing back, by the one or more processors, a recording of a presenter that was unable to participate in the meeting.

14. The method of claim 5, further comprising:
    sending, by the one or more processors, a message to a presenter during the meeting indicating that a topic associated with the presenter is approaching, the message including a time at which the presenter is to begin presenting the topic and an amount of time allotted to the topic.

15. The method of claim 6, further comprising:
    prior to the time allotted to the topic elapsing, sending, by the one or more processors, a message to the presenter indicating that an amount of time allotted to the presenter will be elapsing.

16. The method of claim 5, further comprising:
    sending, by the one or more processors to a meeting invitee that declined to participate in the meeting, a notification that a topic or a presenter in which the meeting invitee had indicated an interest is about to present.

17. A method comprising:
    retrieving, by one or more processors, a meeting template associated with a meeting;
    determining, by the one or more processors, multiple participants to participate in the meeting based at least in part on the meeting template;
    retrieving, by the one or more processors from individual computing devices corresponding to individual participants of the multiple participants, individual schedules associated with the individual participants of the multiple participants;
    scheduling, by the one or more processors, the meeting based on the individual schedules;
    determining, by the one or more processors, that conditions associated with initiating the meeting have been satisfied;
    determining, by the one or more processors, an identity of at least one individual participant by performing voice recognition on audio data provided by a microphone or by performing facial recognition on video data provided by a video camera;
    retrieving, by the one or more processors from the individual computing devices, updated individual schedules associated with the individual participants;
    rearranging, by the one or more processors, an order of one or more topics to be discussed in the meeting based on the updated individual schedules; and
    after the meeting had concluded, automatically scheduling at least one follow-up meeting for at least a portion of the multiple participants.

18. The method of claim 17, wherein rearranging, by the one or more processors, the order of the one or more topics to be discussed in the meeting based on the updated individual schedules comprises modifying, by the one or more processors, an amount of time allotted to at least one topic of the one or more topics to be discussed in the meeting.

19. The method of claim 17, wherein rearranging, by the one or more processors, the order of the one or more topics to be discussed in the meeting based on the updated individual schedules comprises modifying, by the one or more processors, a number of topics to be discussed in the meeting.

20. The method of claim 17, wherein determining that conditions associated with initiating the meeting have been satisfied comprises:
    identifying, by the one or more processors, at least one particular participant without which the meeting cannot be initiated; and
    determining, by the one or more processors based on the voice recognition or the facial recognition, that the at least one particular participant is present.

* * * * *